(12) United States Patent
Mitsuhara (10) Patent No.: US 8,798,861 B2
(45) Date of Patent: Aug. 5, 2014

(54) ELECTRIC POWER STEERING APPARATUS

(75) Inventor: Takashi Mitsuhara, Uda (JP)

(73) Assignee: JTEKT Corporation, Osaka (JP)

( * ) Notice: Subject to any disclaimer, the term of this patent is extended or adjusted under 35 U.S.C. 154(b) by 1093 days.

(21) Appl. No.: 12/588,078

(22) Filed: Oct. 2, 2009

(65) Prior Publication Data

US 2010/0094507 A1 Apr. 15, 2010

(30) Foreign Application Priority Data

Oct. 9, 2008 (JP) ................................. 2008-263038

(51) Int. Cl.
*B62D 6/00* (2006.01)

(52) U.S. Cl.
USPC .......................................................... 701/41

(58) Field of Classification Search
CPC .. B62D 5/0481; B62D 5/0484; B62D 5/0496; B62D 6/00; B62D 15/02; B62D 15/0205; B62D 15/021; B62D 15/0215; B62D 15/022; B62D 15/023; B62D 15/0235; B62D 15/0245; B62D 15/025
USPC ........................ 701/41–44; 180/443, 446, 428
See application file for complete search history.

(56) References Cited

U.S. PATENT DOCUMENTS

| | | | | |
|---|---|---|---|---|
| 4,716,981 | A * | 1/1988 | Murao | 180/412 |
| 6,354,396 | B1 * | 3/2002 | Horton et al. | 180/446 |
| 6,650,980 | B2 * | 11/2003 | Ashrafi | 701/41 |
| 2002/0124663 | A1 * | 9/2002 | Tokumoto et al. | 73/862.333 |
| 2004/0188172 | A1 * | 9/2004 | Asada | 180/446 |
| 2005/0127280 | A1 * | 6/2005 | Ura | 250/231.13 |
| 2005/0236221 | A1 * | 10/2005 | Ura | 180/443 |
| 2007/0233345 | A1 * | 10/2007 | Endo et al. | 701/41 |

FOREIGN PATENT DOCUMENTS

| | | | |
|---|---|---|---|
| JP | A-2000-296781 | 10/2000 | |
| JP | A-2004-37312 | 2/2004 | |
| JP | A-2004-177273 | 6/2004 | |
| JP | A-2005-145404 | 6/2005 | |
| WO | WO 2007/055092 A1 * | 5/2007 | ............. G01D 5/244 |

OTHER PUBLICATIONS

Jan. 29, 2013 Japanese Office Action issued in Japanese Patent Application No. 2008-263038 (with translation).

* cited by examiner

*Primary Examiner* — Thomas Black
*Assistant Examiner* — Ce Li
(74) *Attorney, Agent, or Firm* — Oliff PLC (57) ABSTRACT

An electric power steering system includes: a shaft angle sensor that outputs a signal indicating a rotation angle of a shaft through which a turning operation force is transmitted to a steering mechanism; a motor angle sensor that outputs a signal indicating a rotation angle of a motor; and a control section that determines the number of turns of the steering wheel based on both outputs of the shaft angle sensor and the motor angle sensor, wherein when it is required to determine the number of turns, the control section detects an angle error between the outputs of the shaft angle sensor and the motor angle sensor based on the outputs thereof and when the angle error falls within a predetermined allowable range, the control section determines the number of turns, and when the angle error is out of this range, the control section avoids determining the number of turns.

8 Claims, 8 Drawing Sheets

F I G . 6

ELECTRIC POWER STEERING APPARATUS

INCORPORATION BY REFERENCE

The disclosure of Japanese Patent Application No. 2008-263038 filed on Oct. 9, 2008 including the specification, drawings and abstract is incorporated herein by reference in its entirety.

BACKGROUND OF THE INVENTION

1. Field of the Invention

The invention relates to an electric power steering system mounted on a vehicle, such as an automobile, and in particular to the function performed when the number of turns of the steering wheel is detected in the system.

2. Description of the Related Art

A steering system for an automobile is configured so that the rotation of the steering shaft and the pinion shaft caused by a turning operation of the steering wheel is converted, through a rack-and-pinion gear, into a linear motion of a steering mechanism that includes a rack shaft, whereby a desired steering angle is given to the steered wheels. In the electric power steering system, the steering assist force corresponding to the steering torque given by the driver is generated by the motor with a speed reducer and applied to the steering mechanism. The steering torque is detected by the torque sensor. The torque sensor detects the amount of torsion of the torsion bar, that is, the difference between the rotation angle on the input side and the rotation angle on the output side when the pinion shaft is turned by the steering shaft through the torsion bar.

Meanwhile, when the absolute steering angle of the steering wheel is detected in addition to the steering torque, it is possible to precisely control the increase and decrease of the steering assist force with the absolute steering angle as well as the steering torque taken into account. The information on the absolute steering angle is required also when systems other than the electric power steering system are controlled, such as when the distribution of the braking force system is controlled in the Antilock Brake System (ABS). Thus, a shaft angle sensor for detecting the rotation angle of the pinion shaft (shaft angle) is provided.

In general, the steering wheel rotates four to five turns between the right and left steering limit positions. The pinion shaft rotates equally. From the viewpoint of sensor mechanism, it is not economically advantageous to use a sensor which can continuously detect the absolute steering angle over the whole rotation range. Thus, in actuality, a sensor, such as a resolver, that detects the angle within a range of 360 degrees is used. The control section that receives the output from such a sensor has to determine the number of turns of the steering wheel at the current position relative to the point of origin. Based on the number of turns and the current output value of the sensor, the absolute steering angle within the whole rotation range is detected. When it comes to what is the point of origin, during straightforward running when the vehicle is running, for example, it may be determined that the steering wheel is at the point of origin. However, when the ignition switch is turned on to start a vehicle from the parked state, neither the point of origin nor the number of turns cannot be determined and the absolute steering angle is uncertain.

Thus, a system, provided with a motor angle sensor for detecting the angular position of the motor in addition to the shaft angle sensor, that detects the absolute steering angle based on the combination of the outputs of these sensors, is available. See Japanese Patent Application Publication No. 2000-296781, for example. This document discloses a system that is configured so that the same combination of the output values of the sensors does not appear twice for the absolute steering angle over the whole rotation range, by setting the ratio of speed reduction by the speed reducer between the pinion shaft and the motor, which are mechanically linked to each other, so that the ratio between the number of turns of the motor and the number of turns of the pinion shaft is a predetermined ratio that is not expressed by an integer number. Such a configuration makes it possible to detect the number of turns and the unique absolute steering angle based on the combination of the output value of the shaft angle sensor and the output value of the motor angle sensor.

In order to detect the absolute steering angle based on the combination of the output value of the shaft angle sensor and the output value of the motor angle sensor as described above, it is necessarily required that the correlation between the outputs of these sensors is unchanged. However, when there are a torsion, a backlash, and expansion and contraction due to temperature change in the mechanical portion that connects between the motor and the pinion shaft, the above correlation slightly varies. As a result, a shift occurs in the combination of the output values of these sensors, so that an erroneous number of turns (typically, the number shifted by one) can be detected and an erroneous absolute steering angle can be detected based on the erroneous number of turns. When this occurs, the control of the steering assist force based on the absolute steering angle cannot be appropriately performed.

SUMMARY OF THE INVENTION

An object of the invention is to provide an electric power steering system that solves the above problem, that is, that prevents erroneous determination of the number of turns.

An aspect of the invention is an electric power steering system that transmits a steering assist force generated by a motor to a steering mechanism. The electric power steering system includes the first sensor that outputs a signal indicating the rotation angle of a shaft through which a force of a turning operation of a steering wheel is transmitted to a steering mechanism, the second sensor that outputs a signal indicating the rotation angle of a motor, and a control section that determines the number of turns of the steering wheel based on both of the output of the shaft angle sensor and the output of the motor angle sensor. When it is required to determine the number of turns, the control section detects an angle error between the output of the first sensor and the output of the second sensor based on the output of the first sensor and the output of the second sensor and when the angle error falls within a predetermined allowable range, the control section determines the number of turns, and on the other hand, when the angle error is out of the predetermined allowable range, the control section avoids determining the number of turns.

When the above electric power steering system includes a temperature sensor that detects the temperature near the steering mechanism, the control section may detect the angle error after performing a thermal correction of at least one of the output of the first sensor and the output of the second sensor, based on the temperature detected by the temperature sensor.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described below with reference to the attached drawings.

First Embodiment

Figure 1:
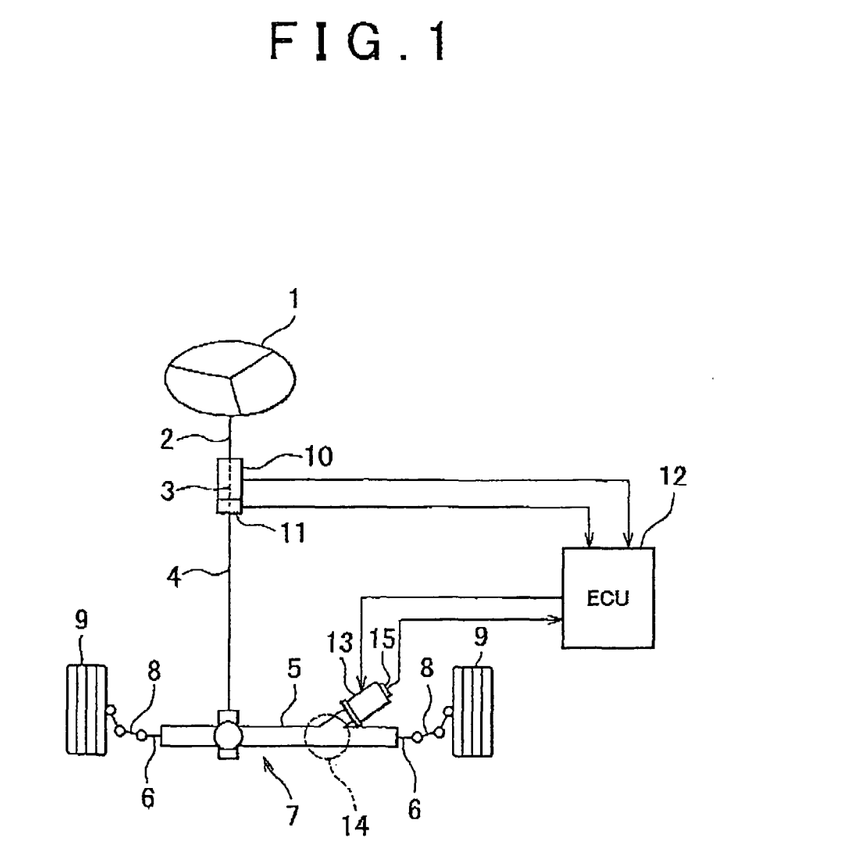
FIG. 1 shows a schematic configuration diagram of an electric power steering system according to a first embodiment of the invention.

FIG. 1 is a schematic configuration diagram of an electric power steering system according to a first embodiment of the invention. A steering wheel 1 is connected to a steering shaft 2. The steering shaft 2 is connected to a pinion shaft 4 via a torsion bar 3. The pinion (not shown) formed at the lower end of the pinion shaft 4 meshes with the rack (not shown) formed on a rack shaft 6 in a rack housing 5, thereby forming a rack-and-pinion steering mechanism 7. A steered wheel 9 is connected to each end of the rack shaft 6 via a tie rod 8. When the pinion shaft 4 rotates about its axis, the rack shaft 6 linearly moves along the shaft (in the lateral direction in FIG. 1) and a steering angle is given to each steered wheel 9 via the tie rod 8.

The steering torque given when a driver turns the steering wheel 1 causes a torsion of the torsion bar 3. The amount of torsion is detected by a torque sensor 10 in the form of a relative difference between the rotation angle on the input side and the rotation angle on the output side of the torsion bar 3. The signal indicating the rotation angle of the pinion shaft 4 (herein also referred to as "shaft angle") is output from a shaft angle sensor 11. The output of the torque sensor 10 and the output of the shaft angle sensor 11 are sent to an electronic control unit (ECU) 12, which functions as the control section. A motor 13 is attached to the rack housing 5 and the rotational driving force of the motor 13 is used to apply a steering assist force to the rack shaft 6 through a speed reducer 14 made up of a warm, a ball screw, etc. (not shown). The motor 13 is driven by the ECU 12. A motor angle sensor 15 outputs a signal indicating the rotation angle of the motor 13 and the output is sent to the ECU 12.

The shaft angle sensor 11 is a resolver, for example, which has characteristics such that the output varies linearly, in which, for example, one cycle corresponds to a turn (360 degrees) of the pinion shaft 4, which is the subject of detection. The shaft angle sensor may be provided for the steering shaft 2 because it suffices that the shaft that is the detection subject of the shaft angle sensor 11 is the shaft that transmits the force of the turning operation of the steering wheel 1 to the steering mechanism 7. Note that because the torque sensor 10 includes two angle sensors, one of these angle sensors can be also used as the shaft angle sensor.

The motor angle sensor 15 is also a resolver, for example, which has characteristics such that the output varies linearly, in which, for example, one cycle corresponds to a turn (360 degrees) of the motor 13 (more specifically, the rotor thereof), which is the detection subject. When a brushless motor is used, into which a rotation angle sensor for drive use is incorporated, this rotation angle sensor may be also used as the motor angle sensor. The ECU 12 monitors whether there is an abnormality in the function of the sensor, based on the signals output from the sensors 10, 11, and 15. In addition, the ECU 12 has a function of monitoring the voltage of the battery (not shown) and vehicle speed.

When the driver turns the steering wheel 1 of the electric power steering system, the force of the turning operation is transmitted to the steering mechanism 7 through the steering shaft 2, the torsion bar 3, and the pinion shaft 4. The ECU 12 drives the motor 13 to generate a required steering assist force based on the absolute steering angle (described later in detail) of the steering wheel 1 and on information, such as the vehicle speed, in addition to the steering torque of the steering operation. In this way, the electric power steering system assists steering.

Next, the relation between the number of turns of the steering wheel 1 and the rotation angle of the motor 13 will be described with reference to FIG. 2. The number of turns of the steering wheel 1 is substantially equal to the number of turns of the pinion shaft 4. In diagrams FIG. 2A to FIG. 2D, the larger radius circle on the left side represents the steering wheel and the smaller radius circle on the right side shows the rotation angle of the motor 13. In the state shown by the diagram FIG. 2B, the number of turns of the steering wheel, N=0 and the rotation angle of the motor is zero degree. When the steering wheel is turned clockwise 360 degrees from this state, the state shown by the diagram FIG. 2A (the number of turns, N=1) is reached. The rotation angle of the motor is 108 degrees. This is because the speed reduction ratio of the motor 13 with respect to the steering mechanism 7 is not an integer number.

Figure 2A:
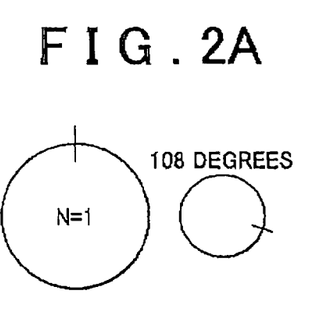
FIG. 2A is a diagram showing a relation between the number of turns of the steering wheel and the rotation angle of the motor.
Figure 2B:
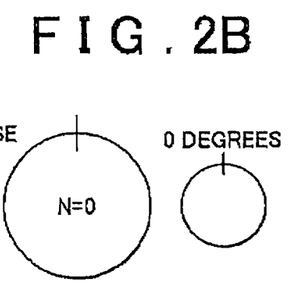
FIG. 2B is a diagram showing a relation between the number of turns of the steering wheel and the rotation angle of the motor.
Figure 2C:
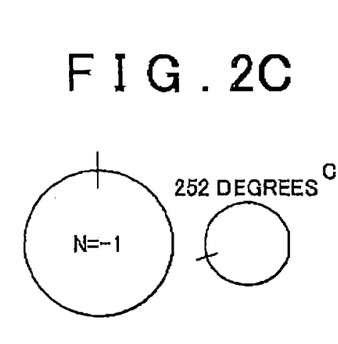
FIG. 2C is a diagram showing a relation between the number of turns of the steering wheel and the rotation angle of the motor.
Figure 2D:
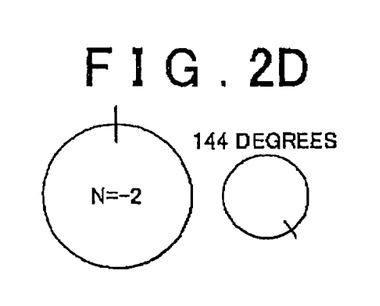
FIG. 2D is a diagram showing a relation between the number of turns of the steering wheel and the rotation angle of the motor.

Specifically, the speed reduction ratio is 27.3, for example and the motor 13 rotates 27.3 turns when the pinion shaft 4 rotates one turn. Specifically, as the steering wheel is turned clockwise 360 degrees from the state shown by the diagram FIG. 2B, the motor rotates (27+0.3) turns, so that the shift of an angle of 108 degrees (=360 degrees×0.3) corresponding to 0.3 turn is caused and the state shown by the diagram FIG. 2A. is reached. Similarly, when the steering wheel is turned counterclockwise 360 degrees from the state shown by the diagram FIG. 2B, the shift of an angle of −108 degrees is caused and the state shown by the diagram FIG. 2C is reached, in which the number of turns, N=−1 and the rotation angle of the motor is 252 degrees (360 degrees−108 degrees). When the steering wheel is turned counterclockwise 360 degrees from the state shown by the diagram FIG. 2C, the shift of an angle of −216 degrees relative to the state shown by the diagram FIG. 2B is caused and the state shown by the diagram FIG. 2D is reached, in which the number of turns, N=−2 and the rotation angle of the motor becomes 144 degrees (360 degrees−216 degrees).

FIG. 3 show waveform diagrams each showing the output of the shaft angle sensor 11 (one cycle) and the output of the motor angle sensor 15 (27.3 cycles), with the outputs being superimposed in one graph. The horizontal axis indicates the absolute steering angle of the steering wheel 1 (pinion shaft 4) and the vertical axis indicates the outputs of the sensors 11 and 15, which are normalized to the 360-degree angle. Diagrams FIG. 3A to FIG. 3D correspond to the diagrams FIG. 2A to FIG. 2D, respectively. Specifically, the diagram FIG. 3A shows the outputs of the sensors when the number of turns, N=1, the diagram FIG. 3B shows the outputs of the sensors when the number of turns, N=0, the diagram FIG. 3C shows the outputs of the sensors when the number of turns, N=−1, and the diagram FIG. 3D shows the outputs of the sensors when the number of turns, N=−2, respectively.

Figure 3A:
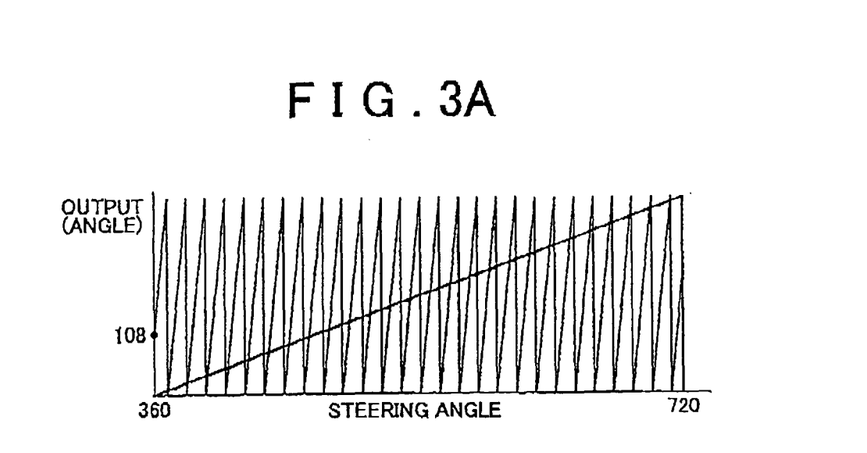
FIG. 3A shows waveform diagram showing the output of the shaft angle sensor (one cycle) and the output of the motor angle sensor (27.3 cycles), with the outputs being superimposed in one graph.
Figure 3B:
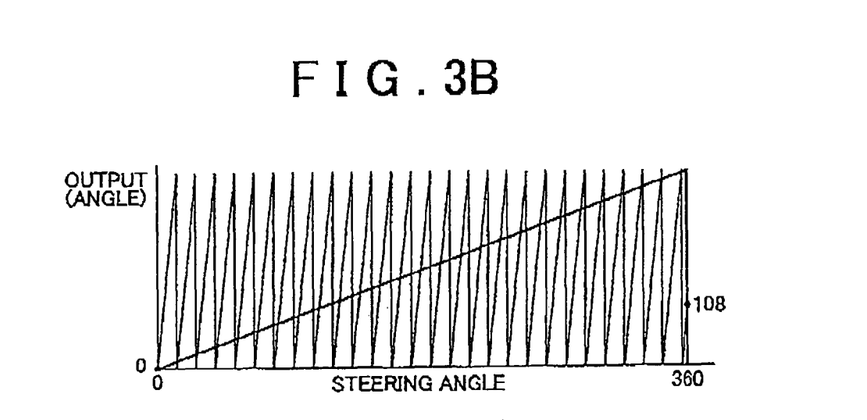
FIG. 3B shows waveform diagram showing the output of the shaft angle sensor (one cycle) and the output of the motor angle sensor (27.3 cycles), with the outputs being superimposed in one graph.
Figure 3C:
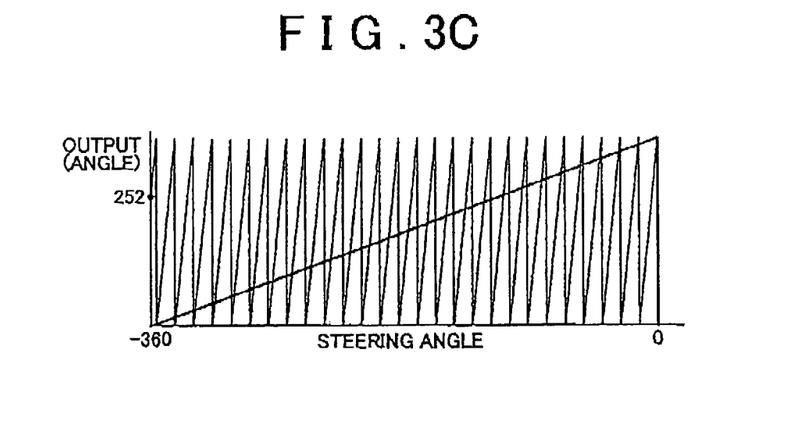
FIG. 3C shows waveform diagram showing the output of the shaft angle sensor (one cycle) and the output of the motor angle sensor (27.3 cycles), with the outputs being superimposed in one graph.
Figure 3D:
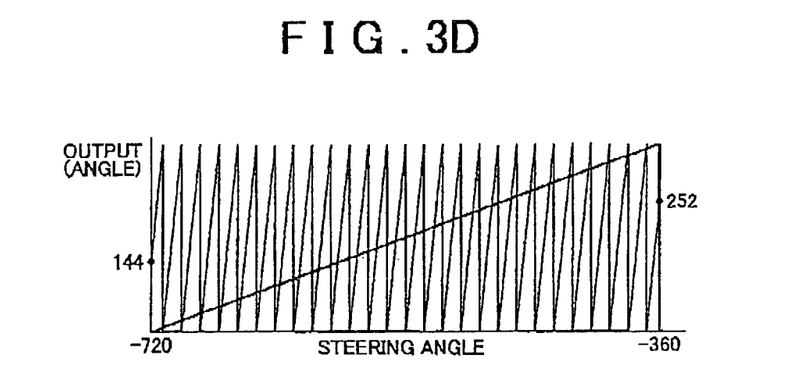
FIG. 3D shows waveform diagram showing the output of the shaft angle sensor (one cycle) and the output of the motor angle sensor (27.3 cycles), with the outputs being superimposed in one graph.

In the state shown by the diagram FIG. 3B (the number of turns, N=0), when the rotation angle of the pinion shaft (hereinafter referred to as the pinion angle) is zero, the motor angle is also zero. In the state shown by the diagram FIG. 3A (the number of turns, N=1), when the pinion angle is zero, the motor angle is 108 degrees. In the state shown by the diagram FIG. 3C (the number of turns, N=−1), when the pinion angle is zero, the motor angle is 252 degrees. In the state shown by the diagram FIG. 3D, when the pinion angle is zero, the motor angle is 144 degrees. Thus, the motor angle corresponding to a certain pinion angle differs depending on the number of turns because the shift of the rotation angle differs depending on the number of turns. In other words, when the pinion angle and the motor angle are determined, it is determined to which one of the four numbers of turns the waveforms correspond, on which these angle values exist. Thus, even when the sensors are used, of which the detection range spans 360 degrees, it is possible to determine the number of turns when the motor angle and the pinion angle are determined.

In order to accurately determine the number of turns, it is necessary that there is no abnormality in the shaft angle sensor 11 and the motor angle sensor 15, and in addition, that there is no torsion, no backlash, and no expansion and contraction due to temperature change in the mechanical portion that connects between the motor 13 and the pinion shaft 4. However, in actuality, the error between the outputs of the sensors and the theoretical values (FIGs 2000-10-24. 3) occurs due to these factors. Between the four numbers of turns N, there is an angular difference of 108 degrees in the motor angle between the cases N=1 and N=0, between the cases N=0 and N=−1, and between the cases N=−1 and N=−2. When there is an angle error that exceeds an angle of 54 degrees that is one half of 108 degrees in terms of the motor angle, the detected values becomes close to the values on the waveform of the next number of turns rather than that of the true number of turns, which can cause an erroneous determination. For example, even when the actual number of turns, N=0, it is determined that the number of turns, N is 1 or −1. Specifically, the number of turns is erroneously determined with a difference of "1".

Figure 4:
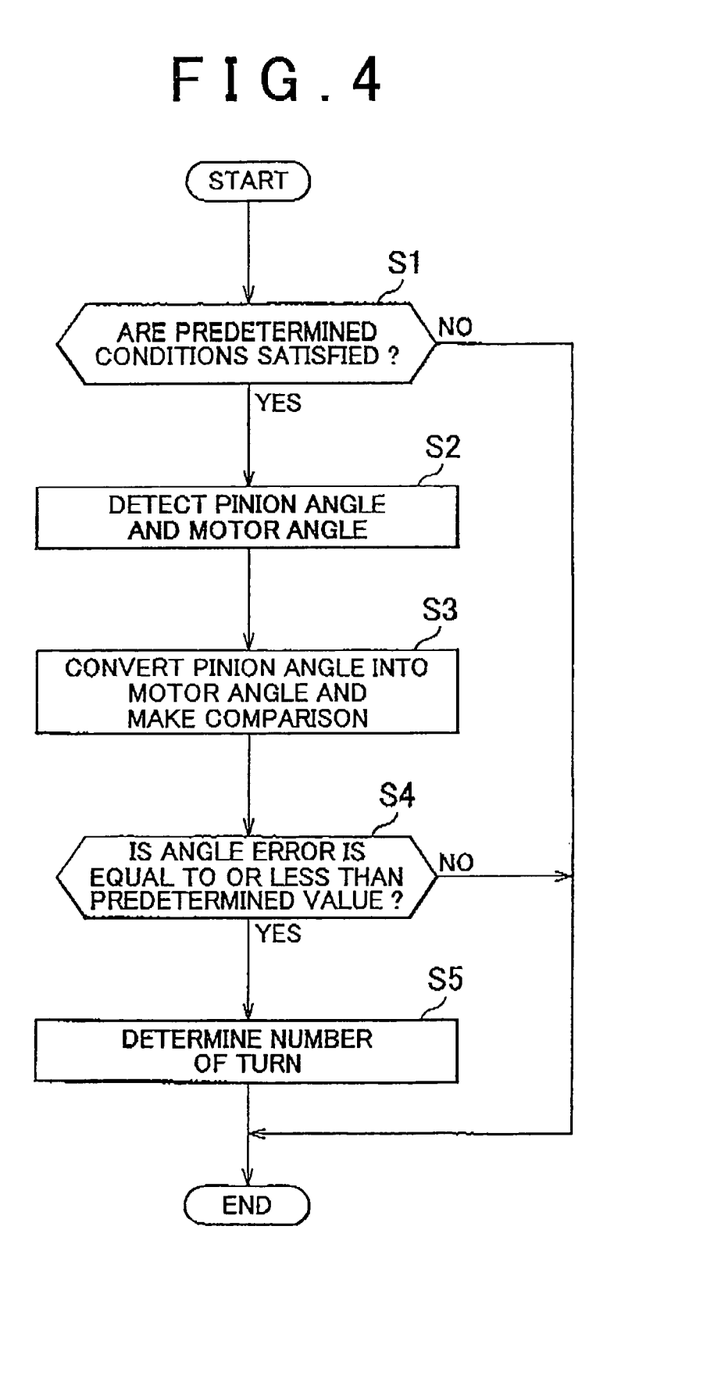
FIG. 4 is a flow chart showing a process executed by an ECU to determine the number of turns.

Next, the process executed by the ECU 12 to determine the number of turns will be described with reference to the flow chart shown in FIG. 4. The process shown in the flow chart is executed by the ECU 12 when necessary. "When necessary" means, for example, when the current number of turns is uncertain, such as when the ignition switch is turned on to start running from the parked state. In FIG. 4, first, the ECU 12 determines whether predetermined conditions are satisfied (step S1). The predetermined conditions include that the battery voltage is normal, that the sensors 10, 11, and 15 are normal, etc. When the predetermined conditions are not satisfied, the process is exited.

Next, the ECU 12 detects the pinion angle and the motor angle based on the outputs of the shaft angle sensor 11 and the motor angle sensor 15 (step S2). The ECU 12 converts the pinion angle according to the rate of the motor angle per pinion angle and the converted pinion angle is compared with the motor angle (step S3). Specifically, when the speed reduction ratio is 27.3 as described above, the pinion angle that is converted into a motor angle that is the absolute angle is expressed as follows:

$$(\theta p + N \times 360) \times 27.3$$

where the pinion angle is $\theta p$ (less than 360 degrees) and the motor angle is $\theta m$ (less than 360 degrees).

The pinion angle detected by the shaft angle sensor 11 that is converted into the motor angle, which is the absolute value, taking account of the four numbers of turns, is as follows: when the number of turns, N is −2, $(\theta p + (-2) \times 360) \times 27.3$; when the number of turns, N is −1, $(\theta p + (-1) \times 360) \times 27.3$; when the number of turns, N is zero, $\theta p \times 27.3$; and when the number of turns, N is 1, $(\theta p + 360) \times 27.3$.

Among these values, the value that is less than 360 is the pinion angle $\theta p'$ converted into a motor angle. When the value is equal to or greater than 360, the residue of division of the value by 360 is the pinion angle $\theta p'$ converted into a motor angle. The ECU 12 then computes four values of $$|\theta m - \theta p'|,$$

as the angle errors, corresponding to the numbers of turns. The ECU 12 determines the number of turns corresponding to the minimum value of the four angle errors to be the sought number of turns. In other words, this is the determination as to which one of the diagrams FIG. 3A to FIG. 3D shows the waveform diagram that gives the relation between or combination of the values of the pinion angle and the motor angle that the detected pinion angle and the detected motor angle most approximate. When the sensors detect the angles equal to the theoretical values, the values of the outputs of the sensors agree with the values on one of the waveform diagrams and the minimum angle error becomes zero.

Next, the ECU 12 determines whether or not the above angle error (minimum value) is equal to or less than the predetermined value, that is, within the allowable range (step S4). The predetermined value needs to be less than 54 degrees that is one half of 108 degrees, the angle error, in terms of the motor angle. However, for the determination that is relatively strictly correct, the predetermined value is preferably two fifth of the angle error in terms of the motor angle, about 43 degrees. Thus, when the minimum angle error is equal to or less than 43 degrees, the ECU 12 determines the number of turns corresponding to the angle error (step S5). When the minimum angle error is greater than 43 degrees, the determination of the number of turns is avoided and the process is exited (NO in step S4). This "avoidance" makes it possible to reliably prevent the occurrence of erroneous determination of the number of turns. When the determination of the number of turns is avoided in this step, the number of turns is determined during the next execution of the process of the flow chart shown in FIG. 4 or later. Note that, in many cases, the torsion and backlash at the mechanical portion are settled when the steering wheel is moved even by a small amount and when the torsion and the backlash are settled, the angle error becomes equal to or less than the predetermined value and the number of turns is determined.

As described above, according to the electric power steering system of this embodiment, the ECU 12, which functions as the control section, avoids determining the number of turns when the angle error does not fall within the allowable range even when it is required to determine the number of turns. Thus, it is possible to prevent the occurrence of erroneous determination of the number of turns. A configuration may be employed in which when the determination of the number of turns is avoided, the ECU 12 provides the indication etc. of occurrence of the avoidance to the driver by, for example, turning on an indication lamp or voice announcement. When the driver operates the steering wheel according to the indication etc., in many cases, the torsion, the backlash, etc. are settled and by executing the process shown in FIG. 4 thereafter, it is possible to determine the number of turns.

When the angle error is then brought to within the predetermined allowable range, the control section can determine the number of turns. In the above electric power steering system, it is preferable that the allowable range be less than half of the shift of the rotation angle of the motor corresponding to one turn of the shaft. In this case, it is possible to reliably avoid erroneously determining the number of turns to be the number that differs from the actual number of turns by "1".

Second Embodiment

Figure 5:
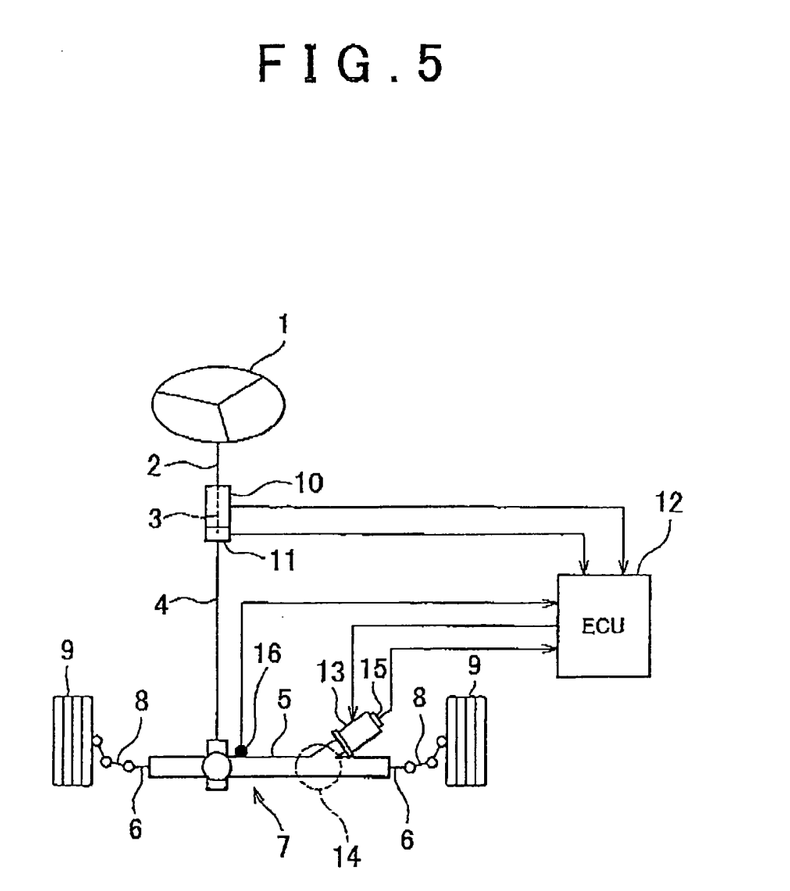
FIG. 5 is a schematic configuration diagram of an electric power steering system according to a second embodiment of the invention.

FIG. 5 is a diagram showing a schematic configuration of an electric power steering system according to a second embodiment of the invention. What is different from the electric power steering system shown in FIG. 1 is that a temperature sensor 16 for detecting the temperature near the steering mechanism 7 is provided and the output therefrom is received by the ECU 12. The other components are the same as those shown in FIG. 1. In this case, the ECU 12 detects the angle error while performing a thermal correction based on the temperature detected by the temperature sensor 16. Although a thermal correction can be performed for one of or both of the detected motor angle and the detected pinion angle, for example, it is easier to perform the thermal correction for the pinion angle output, of which the cycle is relatively greater.

Figure 6:
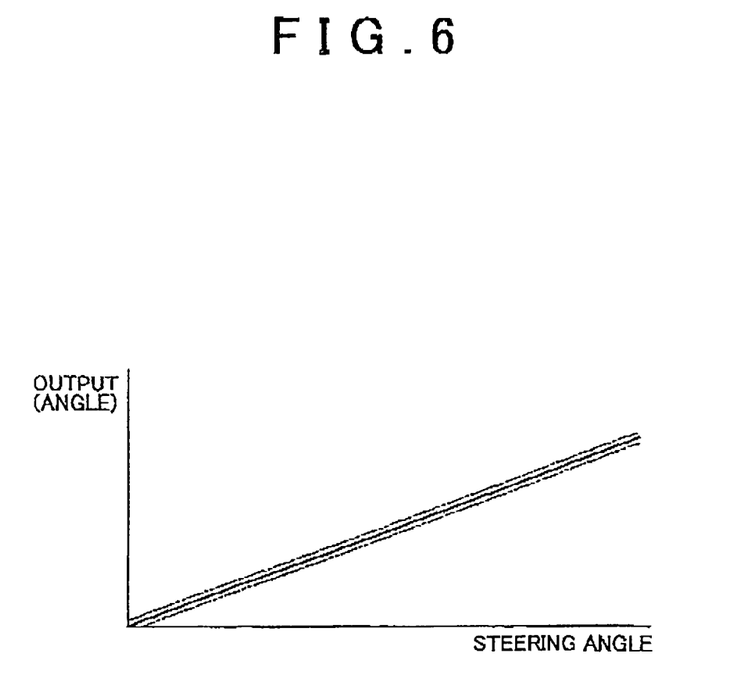
FIG. 6 is a graph showing how the output of the shaft angle sensor (pinion angle) deviates due to temperature change.

FIG. 6 is a graph showing how the output of the shaft angle sensor 11, that is, the pinion angle, deviates due to temperature change. The output shown by the solid line at the reference temperature varies and becomes, for example, the outputs shown by the chain double-dashed lines when the output is influenced by the expansion and contraction of the mechanical portion due to temperature change. Thus, in order to maintain a fixed speed reduction ratio between the pinion angle and the motor angle regardless of temperature change, a thermal correction is needed. Thus, the data concerning how much the pinion angle varies according to the temperature change within the possible range is prepared in advance, and the actually detected output is corrected based on the temperature change.

Figure 7:
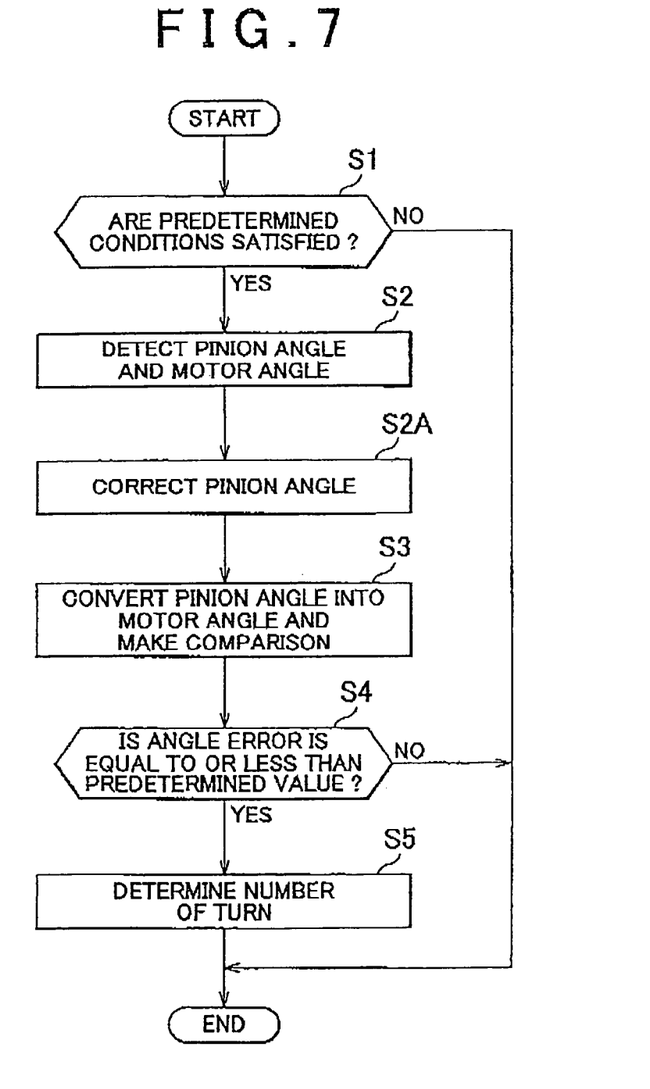
FIG. 7 is a flow chart showing a process executed by an ECU to determine the number of turns in the second embodiment.

FIG. 7 is a flow chart of a process executed by the ECU 12 to determine the number of turns in this embodiment. What is different from the process shown in FIG. 4 is that step S2A of correcting the pinion angle is added. The other steps are the same as those shown in FIG. 4. In this case, the computation of the angle error and the determination of the number of turns are performed based on the pinion angle after a thermal correction. Thus, when the thermal correction is insufficient or excessive and the angle error does not fall within the allowable range, the ECU 12 avoids determining the number of turns. Thus, it is possible to prevent the occurrence of erroneous determination of the number of turns due to inadequate thermal correction.

Although in the above embodiments, rack-and-pinion steering systems are illustrated, it is possible to determine the number of turns and avoid determining the number of turns based on the outputs of the shaft angle sensor and the motor angle sensor also in the case of a ball-nut type steering system.

What is claimed is:

1. An electric power steering system comprising:
   a shaft angle sensor configured to output a signal indicating a rotation angle of a shaft through which a force of a turning operation of a steering wheel is transmitted to a steering mechanism;
   a motor angle sensor configured to output a signal indicating a rotation angle of a motor that generates a steering assist force;
   a temperature sensor configured to detect a temperature near the steering mechanism; and
   a control section configured to: (1) thermally correct the output of the shaft angle sensor and the output of the motor angle sensor, based on the temperature detected by the temperature sensor, (2) determine the number of turns of the steering wheel based on both the output of the shaft angle sensor and the output of the motor angle sensor, and (3) maintain a fixed speed reduction ratio between the output of the shaft angle sensor and the output of the motor angle sensor regardless of temperature changes, wherein:
   when determining the number of turns, the control section detects an angle error between the output of the shaft angle sensor and the output of the motor angle sensor such that; (i) when the angle error falls within a predetermined allowable range, the control section determines the number of turns, and (ii) when the angle error is out of the predetermined allowable range, the control section avoids determining the number of turns, and
   the thermal correction of the output of the shaft angle sensor includes correcting an actual detected pinion angle output based on mapped data that provides a correlation between a change in the shaft angle and a change in temperature.

2. The electric power steering system according to claim 1, wherein the predetermined allowable range is a range in which the angle error is less than half of a shift of the rotation angle of the motor that is caused when the shaft rotates one turn.

3. The electric power steering system according to claim 1, wherein the predetermined allowable range is a range in which the angle error is less than two fifth of a shift of the rotation angle of the motor that is caused when the shaft rotates one turn.

4. The electric power steering system according to claim 1, wherein the control section detects the angle error after performing the thermal correction of at least one of the output of the shaft angle sensor and the output of the motor angle sensor, based on the temperature detected by the temperature sensor.

5. The electric power steering system according to claim 2, wherein the control section detects the angle error after performing the thermal correction of at least one of the output of the shaft angle sensor and the output of the motor angle sensor, based on the temperature detected by the temperature sensor.

6. The electric power steering system according to claim 1, wherein the output of the shaft angle sensor is converted into a motor angle, and when the motor angle is greater than 360, the motor angle is set to a residue of the motor angle divided by 360; and the angle error is detected by comparing the motor angle to the output of the motor angle sensor.

7. The electric power steering system according to claim 1, wherein the control section is configured to provide an indication to a driver when the angle error is outside the predetermined allowable range.

8. An electric power steering system comprising:
a shaft angle sensor configured to output a signal indicating a pinion angle of a shaft through which a force of a turning operation of a steering wheel is transmitted to a steering mechanism;
a temperature sensor configured to detect a temperature near the steering mechanism; and
a control section configured to: (1) thermally correct the output of the shaft angle sensor based on the temperature detected by the temperature sensor, (2) determine the number of turns of the steering wheel based on the output of the shaft angle sensor, and (3) maintain a fixed speed reduction ratio between the pinion angle and the motor angle regardless of temperature changes, wherein:
when determining the number of turns, the control section detects an angle error in the output of the shaft angle sensor such that: (i) when the angle error falls within a predetermined allowable range, the control section determines the number of turns, and (ii) when the angle error is out of the predetermined allowable range, the control section avoids determining the number of turns, and
the thermal correction of the output of the shaft angle sensor includes correcting an actual detected pinion angle output based on mapped data that provides a correlation between a change in the shaft angle and a change in temperature.

* * * * *